United States Patent Office 2,778,834
Patented Jan. 22, 1957

2,778,834
SUBSTITUTED GLYCINAMIDES

William F. Bruce, Havertown, and Joseph Seifter, Philadelphia, Pa., assignors to American Home Products Corporation, New York, N. Y., a corporation of Delaware No Drawing. Application November 18, 1954, Serial No. 469,847

4 Claims. (Cl. 260—287)

This invention relates to new substituted glycinamides.
The compounds of the invention are glycinamides having the general formula

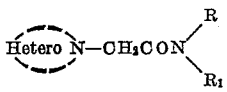

wherein R represents a lower alkyl, while $R_1$ stands for an aralkyl radical, preferably one having from 1 to 4 carbon atoms in the alkyl chain. The designation

is intended to represent either a pyrrolidino radical or a 1,2,3,4-tetrahydro-3-methyl-isoquinolino radical.

The compounds are made by reacting chloracetyl chloride with a secondary amine having the formula

with R and $R_1$ representing the radicals previously described. Benzene or ether is used as a solvent for the reaction. If necessary, some heating may be used. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and either pyrrolidine or 1,2,3,4-tetrahydro-3-methyl-isoquinoline to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally, a reaction or refluxing time of about 10–15 hours is sufficient for complete reaction. In the event that solids are formed these are removed by filtration, the substituted glycinamide product remaining in solution in the solvent. The solvent is finally removed by distillation at low pressures to obtain the desired product.

The following examples are illustrative of the invention.

EXAMPLE 1

Preparation of 1,2,3,4-tetrahydro-3-methyl-isoquinolino-N-methyl-N-benzyl acetamide To 400 cc. of butanol contained in a 2 necked flask, fitted with mechanical stirrer and reflux condenser were added 14.7 gms. of 1,2,3,4-tetrahydro-3-methyl-isoquinoline, 19.7 gms. of N-benzyl-N-methyl-α-chloro acetamide, and 30 gms. of sodium carbonate. The reaction mixture was heated and refluxed overnight. In the morning it was filtered to remove the inorganic salts, which were washed with butanol and the washings added to the filtrate. The filtrate was washed with a 10% sodium hydroxide solution and then with water. The butanol was distilled off under vacuum. The residue was distilled and the product was taken off at 180–187°/.01–05 mm.

EXAMPLE 2

Preparation of 1,2,3,4-tetrahydro-3-methyl-isoquinolino-N-methyl-N-1-methyl-2-phenethyl acetamide To a solution of 149 grams of desoxyephedrine and 79 grams of pyridine in 400 cc. of toluene at −20° C. was added slowly 113 grams of chloro acetyl chloride. The pyridine salts were removed by washing with water and the toluene solution was concentrated. The residue was a syrup containing a substantial percentage of alpha-chloro-N-methyl-N-(1-methyl-2-phenylethyl) acetamide and was used without further purification.

To 200 cc. of butanol contained in a 500 cc. two necked flask, equipped with a mechanical stirrer and reflux condenser, was added 7 grams of 1,2,3,4-tetrahydro-3-methyl-isoquinoline, 11 grams of chloroacetodesoxyephedrine and 15 grams of dry sodium carbonate.

The reaction mixture was refluxed overnight, filtered, concentrated and distilled. The Beilstein test was negative. B. P. 198–202/0.2 mm.

EXAMPLE 3

Preparation of pyrrolidino-N-methyl-N-omega-phenyl-tert.butyl acetamide

To a solution of 140 grams of N-methyl-omega-phenyl-tert.butylamine in 500 cc. of toluene was added dropwise with stirring at −20° C., 48 grams of chloracetyl chloride. The solid amine hydrochloride was filtered off after the mixture had warmed to room temperature. The toluene was distilled in vacuo and the product was fractionated. The compound chloro - N - methyl - N-(omega-phenyl-tert.butyl) acetamide boiled at 140–141° C. at 0.6 mm.

To 300 cc. of butanol contained in a one liter three neck flask, fitted with a mechanical stirrer, reflux condenser, and thermometer was added 14.2 grams (0.20 mole) of pyrrolidine; 23.9 grams (0.10 mole) of chloro-N-methyl-omega-phenyl-tera.butyl acetamide and 30 grams of sodium carbonate. The reaction mixture was refluxed overnight. The solution was washed with water three times, then once with sodium hydroxide solution and three more times with water. The butanol solution was dried over magnesium sulfate and the butanol distilled off under vacuum. The residue was also distilled under vacuum. B. P. 155–157°/1.0 mm.

The compounds of the invention have been found useful as antispasmodics for veterinary or human use, particularly the compound prepared as described in Example 2. Additionally, the compounds have demonstrated local anesthetic action.

Substantially all of the products of the invention are high boiling basic liquids of limited solubility. It is contemplated that while the products may be used in this basic form, it is within the scope of this invention that they may be prepared and used in the form of their acid-addition salts. The preparation of an acid-addition salt is well-known and generally involves the addition of the selected acid to an ether, alcohol or water solution of the basic material. The acid is chosen to yield a salt which is known to those skilled in the art as being physiologically non-toxic. As examples, the hydrochloride, sulfate or tartrate salts of the products may be used.

We claim:
1. A compound selected from the group consisting of substituted glycinamides having the formula

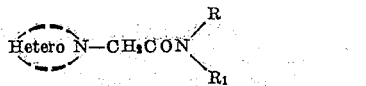

the designation

representing a heterocyclic radical of the group consisting of pyrrolidino and 1,2,3,4-tetrahydro-3-methyl-isoquinolino, while R stands for a lower alkyl radical and $R_1$ represents an aralkyl radical having 1 to 4 carbon atoms in the alkyl chain; and the non-toxic acid-addition salts thereof.

2. The compound, 1,2,3,4 - tetrahydro - 3 - methyl - isoquinolino-N-methyl-N-1-methyl-2-phenethyl acetamide.

3. The compound, 1,2,3,4 - tetrahydro - 3 - methyl-isoquinolino-N-methyl-N-benzyl acetamide.

4. The compound, pyrrolidino-N-methyl-N-omega-phenyl-tert.butyl acetamide.

References Cited in the file of this patent
UNITED STATES PATENTS
2,654,754    Bruce et al. _____ Oct. 6, 1953